United States Patent Office 3,415,825
Patented Dec. 10, 1968

3,415,825
ANTHRAQUINONE DYESTUFFS
Arthur Buehler, Rheinfelden, and Gerd Hoelzle, Liestal, Switzerland, assignors to Ciba Limited, Basel, Switzerland, a company of Switzerland
No Drawing. Filed July 5, 1966, Ser. No. 562,504
Claims priority, application Switzerland, July 7, 1965, 9,559/65
2 Claims. (Cl. 260—249)

ABSTRACT OF THE DISCLOSURE

Anthraquinone dyestuffs which contain at least two groups imparting solubility in water and which correspond to the general formula (1)
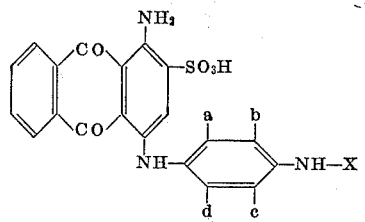

in which $a$, $b$, $c$ and $d$ each represents a low molecular alkyl residue, preferably a methyl residue, and X represents a 2-amino-4-halogeno-1,3,5-triazine residue which is bound to the NH-group by the ring carbon atom in the 6-position, and in which the 2-amino group contains a grouping imparting solubility in water provide dyeings and prints of outstanding purity of shade, light fastness and wet fastness.

---

The present invention provides new dyestuffs of the anthraquinone series which contain at least two groups imparting solubility in water and which correspond to the general formula (1)
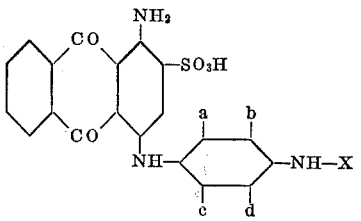

in which $a$, $b$, $c$ and $d$ each represents a low molecular alkyl residue, preferably a methyl residue, and X represents a 2-amino-4-halogeno-1,3,5-triazine residue which is bound to the NH-group by the ring carbon atom in the 6-position, and in which the 2-amino group contains a grouping imparting solubility in water.

The new dyestuffs may be made by condensing anthraquinone dyestuffs of the formula

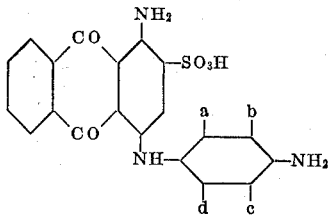

in which $a$, $b$, $c$ and $d$ have the meaning given above for Formula 1 with 2-amino-4,6-dihalogeno-1,3,5-triazines or with trihalogeno-1,3,5-triazines, and in the latter case one of the two halogen atoms in the resulting dihalogeno-triazine condensation product is replaced by reaction with amines containing groups which impart solubility in water.

Anthraquinone dyestuffs of Formula 2 which may be used as starting dyestuffs for the present process are preferably those in which the substituents $a$, $b$, $c$ and $d$ are all identical, for example 1 - amino-4-(4'-amino-2',3',5',6'-tetramethylphenylamino)-anthraquinone-2-sulphonic acid.

Triazines that are at least dihalogenated and which may be condensed with the anthraquinone dyestuffs of Formula 2 are for example cyanuric chloride and cyanuric bromide as well as the monocondensation products of cyanuric chloride or cyanuric bromide with aminoethane-sulphonic acid, sulphatoethylamine or preferably aminobenzenecarboxylic acid, for example anthranilic acid, or aromatic aminosulphonic acids with or without dyestuff character e.g. N-methylanilinesulphonic acid, 1-aminobenzene - 2 - sulphonic acid, 1-aminobenzene-3-sulphonic acid or 1-aminobenzene-4-sulphonic acid, 1-carboxyl-2-aminobenzene-4-sulphonic acid or 1-carboxy-2-aminobenzene - 5 - sulphonic acid, 1-aminobenzene-2,5-disulphonic acid as well as 1- or 2-aminonaphthalene-monodi- or trisulphonic acids, aminodiphenyl-sulphonic acids, aminostilbenesulphonic acids, aminoazobenzene-monosulphonic and disulphonic acids and the like.

The condensation process of the invention may be carried out in known manner for example in an aqueous medium with the addition of acid-binding reagents for example sodium hydroxide or sodium carbonate.

In the dyestuffs obtained by the condensation process according to the present invention, the mobile halogen atoms of the fibre-reactive substituents may be easily replaced, for example by reaction with ternary amines or with hydrazines (e.g. dimethylhydrazine), resulting in fibre-reactive dyestuffs whose replaceable substituent is a quaternary ammonium or hydrazinium group which is bound to a carbon atom, especially a heterocyclic residue, for example, a group of formula

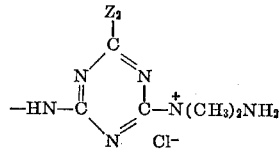

in which $Z_2$ denotes the residue of an aminosulphonic acid.

The dyestuffs obtained according to the process specified are new. They are valuable dyestuffs which are suitable for dyeing and printing a wide variety of materials, for example wool, but especially polyhydroxylated materials of fibrous structure, e.g. substances containing cellulose, including both man-made fibres, for example those made of regenerated cellulose and natural cellulose materials, for example cellulose pulp, linen or above all cotton. They are particularly suitable for dyeing by the so-called direct dyeing method from dilute dye liquors using alkaline aqueous baths which may optionally have a high salt content.

In order to improve the wet fastness properties it is advisable for the dyeings and prints so obtained to be thoroughly rinsed with cold and hot water, optionally with the addition of a material which acts as a dispersing agent and which assists the diffusion of any dyestuff which has not been fixed.

The dyeings and prints obtained by these methods are distinguished by exceptional purity of shade, very good light fastness and outstanding wet fastness properties.

In the examples which follow the parts and percentages are given by weight, unless otherwise stated.

Example 1

28 parts of aniline-2,5-disulphonic acid are dissolved in 200 parts of water with the addition of sodium hydroxide, the solution is neutralised, cooled to 0° C. and mixed with 19 parts of cyanuric chloride. After 2 hours stirring at 0 to 5° C., during which the pH value is kept at 6 to 7 by adding sodium hydroxide, the reaction is complete. The solution obtained is added to a neutral solution of 54.5 parts of the dyestuff 1-amino-(4'-amino-2',3',5',6' - tetramethylphenylamino) - anthraquinone - 2 - sulphonic acid (obtained by condensation of 4-bromo-1-aminoanthraquinone-2-sulphonic acid with 1,4-diamino-2,3,5,6-tetramethylbenzene) dissolved as the sodium salt in 1000 parts of water and stirred for several hours at 35 to 40° C., the pH valve being maintained at 7 by the addition of sodium hydroxide. After the reaction the dyestuff is separated by adding salt, filtered and dried. The dyestuff is a blue powder which dissolves in water with a blue color and in concentrated sulphuric acid with a violet-blue color, and which dyes cotton blue shades having good fastness properties according to the usual dyeing procedures for reactive dyestuffs.

When the corresponding amount of the monocondensation product of 2-amino-5-sulphobenzoic acid is used as the triazine derivative, a dyestuff with similar properties is obtained.

Example 2

A solution of 34.3 parts of the sodium salt of 2-phenylamino-4,6-dichloro-1,3,5,-triazine-3'-sulphonic acid is added to a neutral solution of 62 parts of 1-amino-(4'-amino-2',3',5',6' - tetramethylphenylamino) - anthraquinone - 2, 6-disulphonic acid. The mixture is heated to 40° C. and kept at this temperature for 3 hours, the acid liberated being neutralised by dropwise addition of a dilute solution of sodium hydroxide. When the reaction is complete the dyestuff is separated by means of salt, filtered and dried. The dyestuff dyes cotton fast blue shades.

Example 3

62.6 parts of 1-amino-(4'-amino-2',3',5',6'-tetramethylphenylamino)-anthraquinone-2,6-disulphonic acid are dissolved in 1000 parts of water with the addition of sodium carbonate. This solution is allowed to run into a fine suspension of 19 parts of cyanuric chloride in 300 parts of ice water, the temperature being kept at between 5 and 10° C. and the pH value at between 5 and 6 by neutralising with a dilute sodium hydroxide solution. After the condensation a solution of 17.3 parts of 1-aminobenzene-4-sulphonic acid is added and the reaction mixture is stirred for 3 hours at 40° C. The monochlorotriazine dyestuff is salted out, filtered and dried. The dyestuff dyes cotton fast blue shades.

When 1-amino-(4'-amino-2',3',5',6'-tetramethylphenylamino)-anthraquinone-2,5- or -2,8'-disulphonic acids are used as the blue components, dyestuffs or similar properties are obtained.

Dyeing instruction 2 parts of dyestuff are dissolved in 100 parts of water.
A woven cotton fabric is impregnated with this solution by padding at 80° C. and the excess liquid is squeezed out so that the material retains 75% of its weight of dyestuff solution.

The goods thus treated are dried and impregnated at room temperature with a solution containing 10 g. of sodium hydroxide and 300 g. of sodium chloride per litre, squeezed till 75% of the liquid is retained, and steamed for 60 seconds at 100 to 101° C. The material is then rinsed, treated in an 0.5% sodium bicarbonate solution, rinsed, soaped for quarter of an hour in an 0.3% solution of a nonionic detergent at the boil, rinsed and dried.

A fixed dyeing which is fast to boiling is obtained. When a rayon fabric is used instead of a cotton fabric, a similarly good result is obtained.

When the impregnation with the dyestuff solution is carried out at 30° C. instead of at 80° C. as described, a similarly good result is obtained.

What is claimed is:
1. An anthraquinone dyestuff of formula

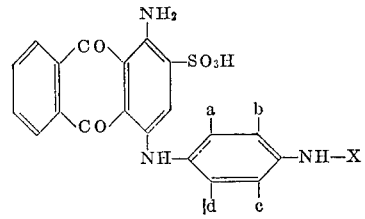

in which $a$, $b$, $c$ and $d$ each represents a methyl residue, and X a 2-amino-4-halogeno-1,3,5-triazine residue which is bound to the NH-group by the ring carbon atom in the 6-position, and wherein the amino group in 2-position contains a sulfophenyl grouping.

2. The dyestuff of the formula

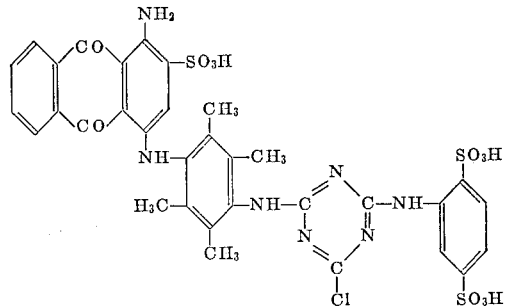

References Cited

UNITED STATES PATENTS 3,223,470   12/1965   Boedeker et al. _____ 260—249

HENRY R. JILES, *Primary Examiner.*

J. M. FORD, *Assistant Examiner.*

U.S. Cl. X.R.

8—54, 54.2, 61